US010289853B2

(12) United States Patent
Kim et al.

(10) Patent No.: US 10,289,853 B2
(45) Date of Patent: May 14, 2019

(54) SECURE DRIVER PLATFORM

(71) Applicant: Microsoft Technology Licensing, LLC, Redmond, WA (US)

(72) Inventors: Minsang Kim, Redmond, WA (US); Kumar Rajeev, Redmond, WA (US); Jason S. Wohlgemuth, Seattle, WA (US); Aacer H. Daken, Renton, WA (US); Peter Wieland, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 304 days.

(21) Appl. No.: 15/087,515

(22) Filed: Mar. 31, 2016

(65) Prior Publication Data
US 2017/0286701 A1    Oct. 5, 2017

(51) Int. Cl.
G06F 9/54 (2006.01)
G06F 21/60 (2013.01)
G06F 21/53 (2013.01)
G06F 21/74 (2013.01)

(52) U.S. Cl.
CPC ............ *G06F 21/606* (2013.01); *G06F 9/545* (2013.01); *G06F 21/53* (2013.01); *G06F 21/604* (2013.01); *G06F 21/74* (2013.01); *G06F 2221/2113* (2013.01)

(58) Field of Classification Search
CPC .... G06F 21/604; G06F 21/606; G06F 21/608; G06F 21/62
USPC ......................................................... 726/27
See application file for complete search history.

(56) References Cited

U.S. PATENT DOCUMENTS 7,007,160 B1 * 2/2006 Makphaibulchoke ...................... G06F 9/4411 713/1
7,380,119 B2    5/2008 Bade et al.
7,603,484 B2   10/2009 Dai et al.
(Continued)

FOREIGN PATENT DOCUMENTS

EP    2911077 A2    8/2015

OTHER PUBLICATIONS

International Search Report and the Written Opinion of the International Searching Authority, issued in PCT Application No. PCT/US2017/024397, dated Jun. 30, 2017, 18 pages.
(Continued)

*Primary Examiner* — Taghi T Arani
*Assistant Examiner* — Badri Narayanan Champakesan
(74) *Attorney, Agent, or Firm* — International IP Law Group, PLLC

(57) ABSTRACT

Techniques described herein enable the implementation of a secure driver framework. In one example, a method includes managing an unsecure operating system execution environment comprising a first user mode and a first kernel mode. The method can also include managing a secure execution environment comprising a second user mode and a second kernel mode, and executing a secure driver within the second user mode of the secure execution environment in response to a system call from an unsecure driver in the first kernel mode or the first user mode, wherein the secure driver enables the unsecure driver to communicate with a secure device. Furthermore, the method can include providing one or more system services of the second kernel mode to the secure driver.

23 Claims, 7 Drawing Sheets

(56) References Cited

U.S. PATENT DOCUMENTS

| | | | |
|---|---|---|---|
| 8,099,596 B1* | 1/2012 | Rusakov | G06F 21/53 380/200 |
| 8,185,783 B2 | 5/2012 | Lee et al. | |
| 8,286,219 B2* | 10/2012 | Khalid | G06F 21/51 713/100 |
| 8,347,070 B1* | 1/2013 | Bacha | G06F 9/4401 713/2 |
| 8,578,477 B1* | 11/2013 | Lin | G06F 21/74 726/21 |
| 8,607,299 B2* | 12/2013 | Baker | G06F 21/6218 718/1 |
| 8,769,305 B2 | 7/2014 | Blaisdell | |
| 8,893,222 B2* | 11/2014 | Russello | G06F 21/60 726/1 |
| 8,996,864 B2 | 3/2015 | Maigne et al. | |
| 9,075,985 B2 | 7/2015 | Diaz-Cuellar et al. | |
| 9,183,391 B2* | 11/2015 | Van De Ven | G06F 12/1491 |
| 9,208,319 B2 | 12/2015 | Avgerinos et al. | |
| 9,769,123 B2* | 9/2017 | Grewal | H04L 63/0428 |
| 9,792,460 B2* | 10/2017 | An | G06F 21/74 |
| 2003/0177371 A1* | 9/2003 | Rothrock | G06F 21/51 713/189 |
| 2008/0065907 A1* | 3/2008 | Nutter | G06F 9/461 713/193 |
| 2009/0157936 A1* | 6/2009 | Goss | G06F 1/3203 710/264 |
| 2009/0204978 A1 | 8/2009 | Lee et al. | |
| 2009/0259857 A1* | 10/2009 | Gehrmann | G06F 21/10 713/193 |
| 2009/0293130 A1* | 11/2009 | Henry | G06F 21/74 726/26 |
| 2011/0044451 A1* | 2/2011 | Anzai | G06F 21/51 380/45 |
| 2012/0331550 A1 | 12/2012 | Raj et al. | |
| 2013/0152180 A1* | 6/2013 | Nair | H04L 63/0823 726/6 |
| 2013/0254829 A1 | 9/2013 | Jakubowski et al. | |
| 2014/0298026 A1* | 10/2014 | Isozaki | H04L 9/0825 713/171 |
| 2014/0317686 A1* | 10/2014 | Vetillard | G06F 21/74 726/2 |
| 2015/0026426 A1 | 1/2015 | Sahita et al. | |
| 2015/0082053 A1* | 3/2015 | Sano | G06F 12/1408 713/193 |
| 2015/0089213 A1* | 3/2015 | Isozaki | G06F 21/74 713/155 |
| 2016/0092678 A1 | 3/2016 | Probert et al. | |
| 2016/0117506 A1* | 4/2016 | Buer | G06F 21/53 726/1 |
| 2017/0249457 A1* | 8/2017 | Tsirkin | G06F 3/0673 |

OTHER PUBLICATIONS

Ganapathy, et al., "Microdrivers: A New Architecture for Device Drivers", In Proceedings of 11th USENIX workshop on Hot Topics in Operating Systems, May 7, 2007, 7 pages.

"ARM1176JZ-S Technical Reference Manual", Retrieved on: Mar. 8, 2016 Available at: http://infocenter.arm.com/help/index.jsp?topic=/com.arm.doc.ddi0333h/Chdfjdgi.html.

Maurice, et al., "Confidentiality Issues on a GPU in a Virtualized Environment", In Proceedings of 18th International Conference Financial Cryptography and Data Security, Mar. 3, 2014, 17 pages.

"Maximum security and reliability", Retrieved on: Mar. 8, 2016 Available at: http://www.ghs.com/secure_networking.html.

* cited by examiner

200

SECURE DRIVER PLATFORM

BACKGROUND

Many applications and hardware devices collect secure data with an expectation that the secure data will be protected from unauthorized access. Further, many computing architectures require exposing the secure data to large driver stacks under the assumption that the drivers can be trusted. For example, the secure data can be transmitted to any number of drivers that can have full access to the system's memory, and thus access to secure data stored within the system's memory. However, the drivers are susceptible to attacks by compromised and/or malicious system software.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for providing a secure driver framework comprising a processor that can manage an unsecure operating system execution environment comprising a first user mode and a first kernel mode and manage a secure execution environment comprising a second user mode and a second kernel mode. The processor can also execute a secure driver within the second user mode of the secure execution environment in response to a system call from an unsecure driver in the first kernel mode or the first user mode. Additionally, the processor can provide one or more system services of the second kernel mode to the secure driver.

In another embodiment, a method for providing a secure driver framework can include managing an unsecure operating system execution environment comprising a first user mode and a first kernel mode. The method can also include managing a secure execution environment comprising a second user mode and a second kernel mode and executing a secure driver within the second user mode of the secure execution environment in response to a system call from an unsecure driver in the first kernel mode or the first user mode, wherein the secure driver enables the unsecure driver to communicate with a secure device. Furthermore, the method can include providing one or more system services of the second kernel mode to the secure driver.

In yet another embodiment, one or more computer-readable storage devices for implementing a secure driver framework can include a plurality of instructions that, based at least on execution by a processor, cause the processor to manage an unsecure operating system execution environment comprising a first user mode and a first kernel mode. The plurality of instructions can also cause the processor to manage a secure execution environment comprising a second user mode and a second kernel mode and execute a secure driver within the second user mode of the secure execution environment in response to a system call from an unsecure driver in the first kernel mode or the first user mode, wherein the secure driver enables the unsecure driver to communicate with a secure device. Furthermore, the plurality of instructions can cause the processor to provide one or more system services of the second kernel mode to the secure driver.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
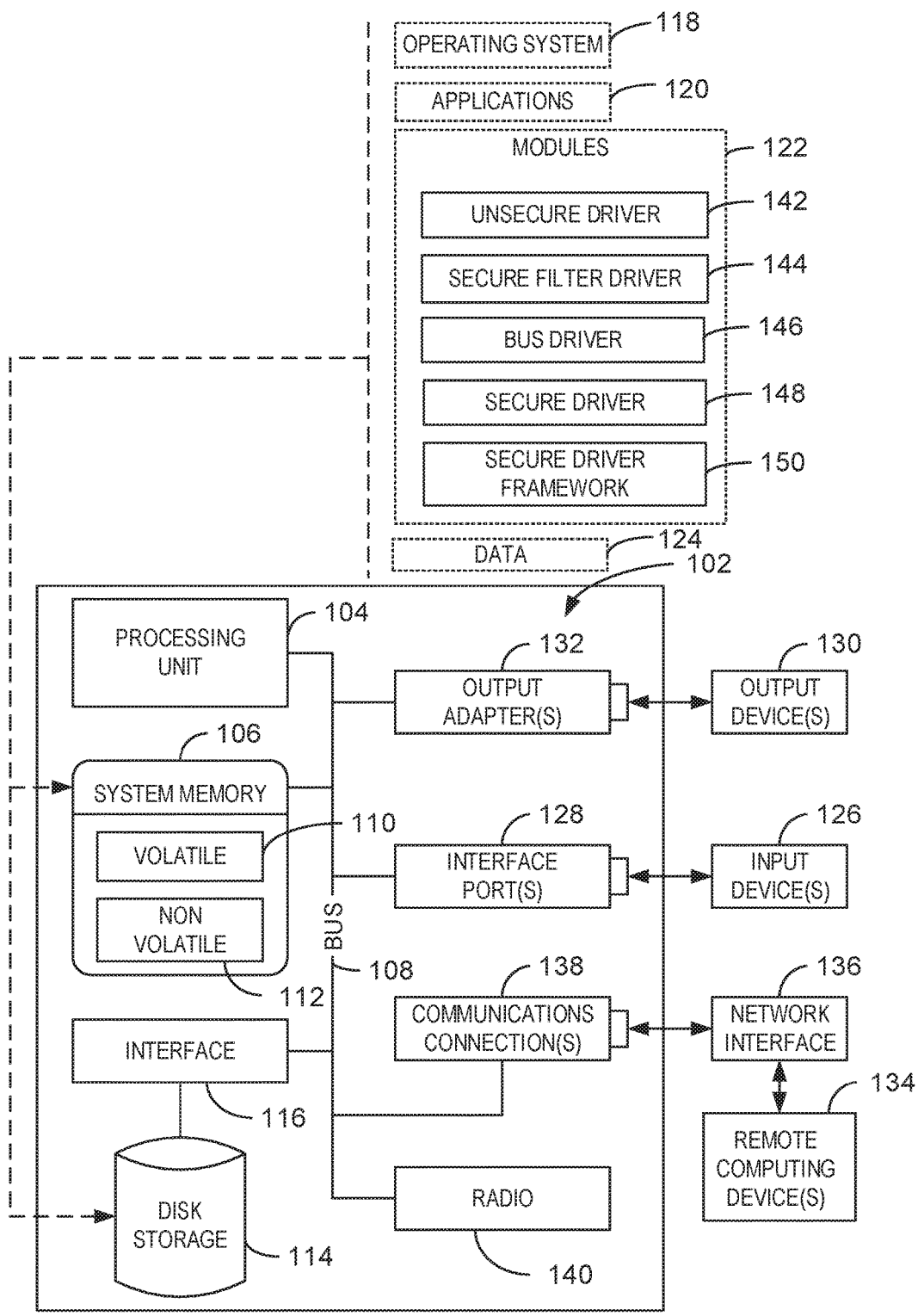
FIG. 1 is a block diagram of an example of a computing system that can implement a secure driver framework.

In embodiments described herein, a system can include a secure driver framework (also referred to herein as "SDF") that provides an isolated execution environment for device drivers. In some examples, a driver can be executed in an unsecure or secure execution environment. With regard to a driver being executed within an unsecure or secure execution environment, a processor can have two different modes: user mode and kernel mode. The mode of the processor can determine restrictions on the type and scope of operations that can be performed. As such, the processor can switch between the two modes depending on the driver being executed.

In embodiments described herein, the secure driver framework can include device drivers that can securely interact with secure devices in a system without the risk of malicious third party code snooping memory-mapped input/output and direct memory access data traffic. Integrity of secure drivers in the secure driver framework is also protected from third party code. As referenced above, the secure driver framework includes a secure user mode and a secure kernel mode. The secure kernel mode can provide a secure, isolated execution environment for secure device drivers that prevent third party code from tampering with driver logic. The secure kernel mode can also protect a peripheral component interconnect (also referred to herein as "PCI") configuration space from any malicious manipulation. Accordingly, the secure kernel mode protects the PCI configuration space and memory-mapped input/output from modifications due to malicious code. The secure kernel mode can also enable direct memory access for secure drivers without releasing data to malicious third party code. The secure driver framework can further enable an unsecure driver to be coupled to a secure driver located in the secure used mode. This enables portions of an unsecure driver that access sensitive code and data to be split into a secure driver.

The techniques described herein enable a system to manage an unsecure operating system execution environment comprising a first user mode and a first kernel mode. The system can also manage a secure execution environment comprising a second user mode and a second kernel mode. Furthermore, the system can execute a secure driver within the second user mode of the secure execution environment in response to a system call from an unsecure driver in the first kernel mode. For example, an unsecure driver can request a system call such as an input/output operation, among others from a secure driver. In some embodiments, the secure driver enables an unsecure driver to execute the system call. Moreover, in some examples, the system can provide one or more system services of the second kernel mode to the secure driver. For example, the system can provide a system service in response to the secure driver transmitting a request to a secure kernel in the second kernel mode. A system service, as referred to herein, can include a direct memory access operation, a memory-mapped input/output operation, an interrupt operation, and the like. The secure driver framework described herein thus provides virtualization-based security that enables an independent hardware vendor to write a driver for a secure device, such as a biometric device, among others, that corresponds to a higher level of security.

In some examples, a hypervisor can manage the unsecure execution environment and the secure execution environment. Further, the hypervisor can provide a virtual partition that includes the unsecure execution environment and the secure execution environment. In addition, the unsecure execution environment and the secure execution environment can utilize a guest physical address space of the virtual partition. In some examples, the hypervisor can include: Microsoft Hyper-V®, Citrix XENServer®, VMWare ESX®, etc. Further, one or more guest operating systems can execute within the virtual partitions provided by the hypervisor. Guest operating systems can include a Microsoft Windows® OS, a Linux/BSD/UNIX OS, Apple® OS X®, etc.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can implement a secure driver framework. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as an unsecure driver 142, a secure filter driver 144, a bus driver 146, a secure driver 148, and a secure driver framework 150, configured to enable implementing the secure driver framework 150. In some embodiments, the unsecure driver 142 (also referred to herein as a high-level unsecure driver) can be an independent hardware vendor driver that attempts to access a secure device via a system call. For example the unsecure driver 142 can attempt to access memory, registers, and the like, associated with a secure device. The unsecure driver 142 can send the system call to the secure filter driver 144, which can detect a system call directed to a secure device and transmit the system call via a remote procedure call to the secure driver framework 150. The secure driver framework 150 can transmit the system call to a secure driver 148, which can communicate the system call to a secure device. In some embodiments, the secure driver framework 150 can return a value from executing the system call on a secure device to the unsecure driver 142 via the secure filter driver 144. In some examples, the unsecure driver 142 can transmit any suitable information to the bus driver 146. In some embodiments, the computing system 102 can load and link the unsecure driver 142, secure filter driver 144, bus driver 146, secure driver 148, and secure driver framework 150 dynamically.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the unsecure driver 142, secure filter driver 144, bus driver 146, secure driver 148, and secure driver framework 150 may be partially, or entirely, implemented in hardware and/or in the processor 104. For example, the functionality may be implemented with an application specific integrated circuit, in logic implemented in the processor 104, or in any other device. In some embodiments, the functionality of the secure filter driver 144 can be included in an input/output subsystem or a plug and play subsystem of an operating system 118. Moreover, the functionality to send data or messages to the secure driver 148 may be implemented in an operating system or kernel API rather than the secure filter driver 144. Additionally, the secure driver framework 150 may not be a separate module. Rather, the secure driver framework 150 may be included in an operating system 118 or any suitable kernel.

Figure 2:
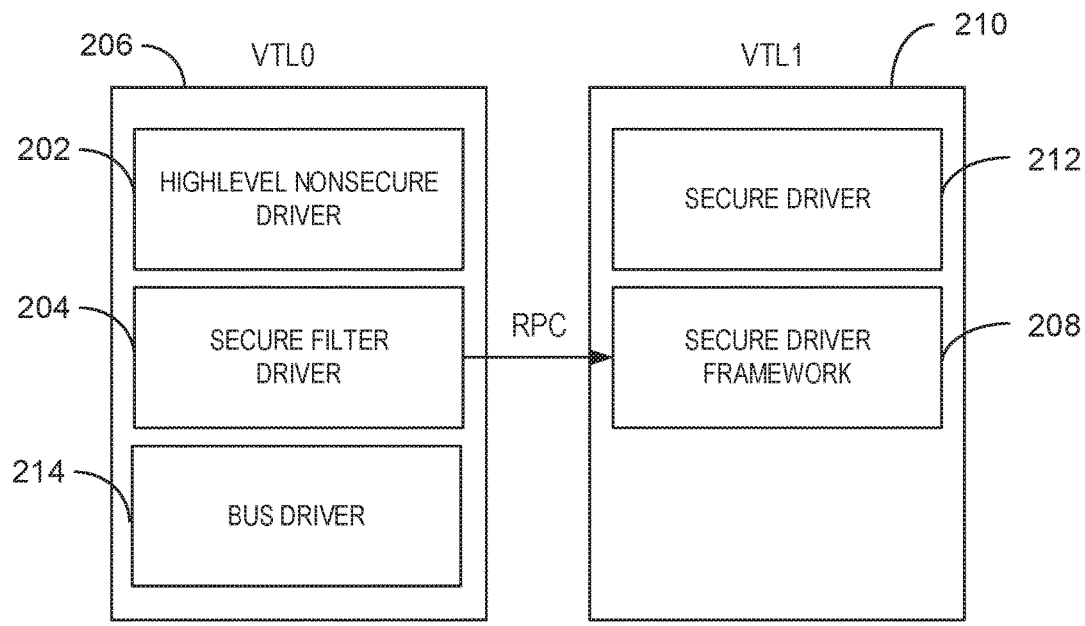
FIG. 2 is a block diagram illustrating an operating system that can implement a secure driver framework.

FIG. 2 is a block diagram illustrating an operating system that can implement a secure driver framework. The operating system 200 can be implemented by any suitable computing device, such as the computing system 102 of FIG. 1.

In some embodiments, a high-level unsecure driver, such as any suitable unsecure function driver, 202 can be loaded to transmit an input/output request packet (IRP) to a secure filter driver 204. In some examples, the secure filter driver 204 can be any suitable filter driver for the high-level unsecure driver 202. In some embodiments, the high-level unsecure driver 202 and the secure filter driver 204 can reside in a kernel mode of an unsecure execution environment (VTL0) 206. The secure filter driver 204 can generate a remote procedure call to a secure driver framework 208 in a user mode of a secure execution environment (VTL1) 210. The secure driver framework 208 can transmit the system call from the remote procedure call to a secure driver 212, which can access a secure device. In some embodiments, the secure driver framework 208 can return a response or return value from execution of the system call on the secure device. For example, the secure driver framework 208 can return a result from any suitable input/output system call, a memory mapped input/output request, a direct memory access request, and the like to a physical device, such as one enumerated by the bus driver 214.

In some embodiments, a memory mapped input/output (MMIO) address range associated with a secure device stores key register blocks in page aligned regions. For controllers that provide access to multiple endpoints (i.e. USB3 controllers, among others), it is possible for some of the secure device's MMIO address ranges to be safely accessed by the non-secure portion of the driver stack (i.e. the high-level unsecure driver 202 and secure filter driver 204). For example, circular event logs indicating completion of previously queued commands can be accessed by the non-secure portion of a driver stack. Therefore, it is possible in this split-driver model for non-secure devices to operate with negligible performance degradation, even when the secure user-mode portion of the driver stack is actively sanity checking requests destined for secure endpoints.

It is to be understood that the block diagram of FIG. 2 is not intended to indicate that the operating system 200 is to include all of the components shown in FIG. 2. Rather, the cooperating system 200 can include fewer or additional components not illustrated in FIG. 2. For example, the secure driver 212 can be executed as a primary service or function driver in a driver stack.

Figure 3:
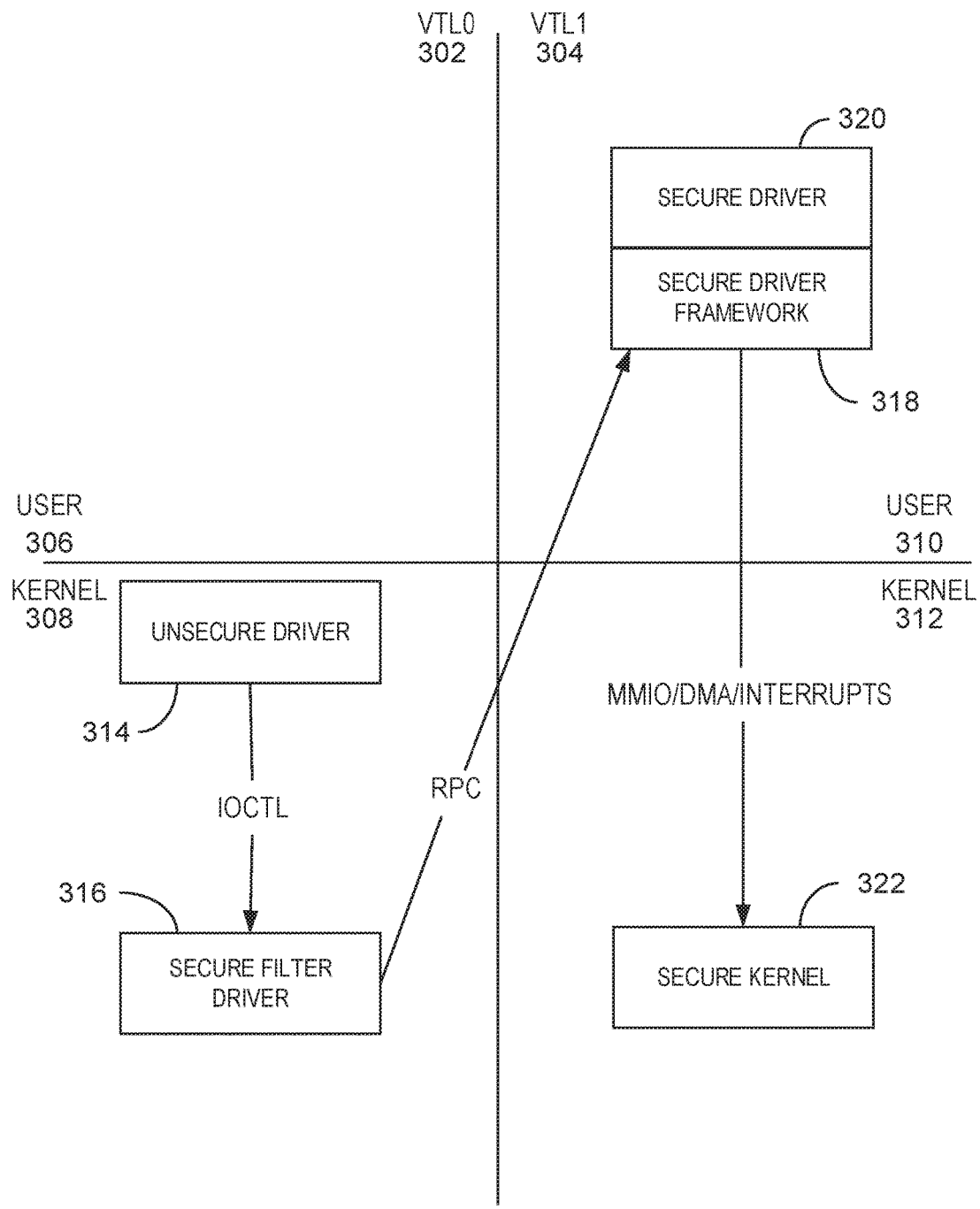
FIG. 3 is a block diagram of an input/output system call to a secure driver framework.

FIG. 3 is a block diagram illustrating a block diagram of an input/output system call to a secure driver framework. The input/output system call of FIG. 3 can be implemented with any suitable computing device, such as the computing system 102 of FIG. 1.

In FIG. 3, a system includes an unsecure execution environment (VTL0) 302 and a secure execution environment (VTL1) 304. The unsecure execution environment 302 and the secure execution environment 304 each include a user mode and a kernel mode. For example, the unsecure execution environment 302 can include an unsecure user mode 306 and an unsecure kernel mode 308 and the secure execution environment 304 can include a secure user mode 310 and a secure kernel mode 312.

In some embodiments, an unsecure driver or function driver 314 can reside in the unsecure kernel mode 308. The unsecure driver 314 can transmit any suitable input/output system call to the secure filter driver 316 in the unsecure kernel mode 308. In some examples, the unsecure driver 314 can transmit any suitable input/output system call to the secure filter driver 316 in the unsecure kernel mode 308 using an input/output control (IOCTL). The secure filter driver 316 can detect that the input/output system call corresponds to a secure device and the secure filter driver 316 can transmit the input/output system call to a secure driver framework 318 residing in the secure user mode 310. In some examples, the secure filter driver 316 can transmit the input/output system call to the secure driver framework 318 residing in the secure user mode 310 using a remote procedure call that includes the buffer contents from the unsecure driver 314. In some embodiments, the secure filter driver 316 can transmit any suitable input/output request packet (also referred to herein as an IRP) to the secure driver framework 318 using a remote procedure call. The remote procedure call can also transmit non-input/output communications corresponding to a plug and play driver tree, power related IRPs, and the like. The secure driver framework 318 can transmit the input/output system call to a secure driver 320 residing in the secure user mode 310 of the secure execution environment 304. The secure driver can transmit the input/output system call to a secure kernel 322 residing in the secure kernel mode 312. In some embodiments, a secure driver framework 318 can provide, via the second kernel mode 312 of the secure execution environment 304, a direct memory access library to the second user mode 310, the direct memory access library enabling buffer allocation and direct read or write operations corresponding to a secure device.

In some embodiments, the unsecure driver 314 can manage interrupts transmitted to the unsecure execution environment 302. The unsecure driver 314 can transmit interrupts corresponding to secure devices to the secure driver 320 via the secure filter driver 316 and the secure driver framework 318 using a remote procedure call. In some embodiments, since the secure driver 320 is executed in user mode, the secure driver 320 can connect to a passive level interrupt handler. For example, when an interrupt is received in the unsecure kernel mode 308, an unsecure kernel can call a passive level interrupt handler provided by the secure filter driver 316. The secure filter driver 316 can execute a remote procedure within the context of the interrupt service routine corresponding to the secure driver. In some embodiments, the unsecure driver 314 can also connect an interrupt at any interrupt request level (also referred to herein as IRQL) for a same line. In some embodiments, any suitable routine, such as the IoReportInterruptInactive routine, among others can be used to mask the interrupt service routine. In some examples, an interrupt can be detected via the unsecure kernel mode of the unsecure operating system execution environment and a remote procedure call can be transmitted to the secure driver in the secure user mode of the secure execution environment, wherein the remote procedure call indicates the detected interrupt.

In some embodiments, the secure filter driver 316 is a kernel mode driver framework that can register windows driver framework callbacks for some plug and play, and power transitions. When the callbacks are invoked, the secure filter driver 316 can execute remote procedure calls to the secure driver 320 to indicate that the callback has occurred. In some examples, the secure driver 320 can detect a start-up sequence comprising a device operational state, a restart from here if device is in low power state, a restart from here if rebalancing resources state, a device arrived state, and a driver loaded state. In some embodiments, the secure driver 320 can detect a removal sequence comprising an input/output stop routine, an interrupt disable routine, a device exit routine, and a device release hardware routine, among others.

Figure 4:
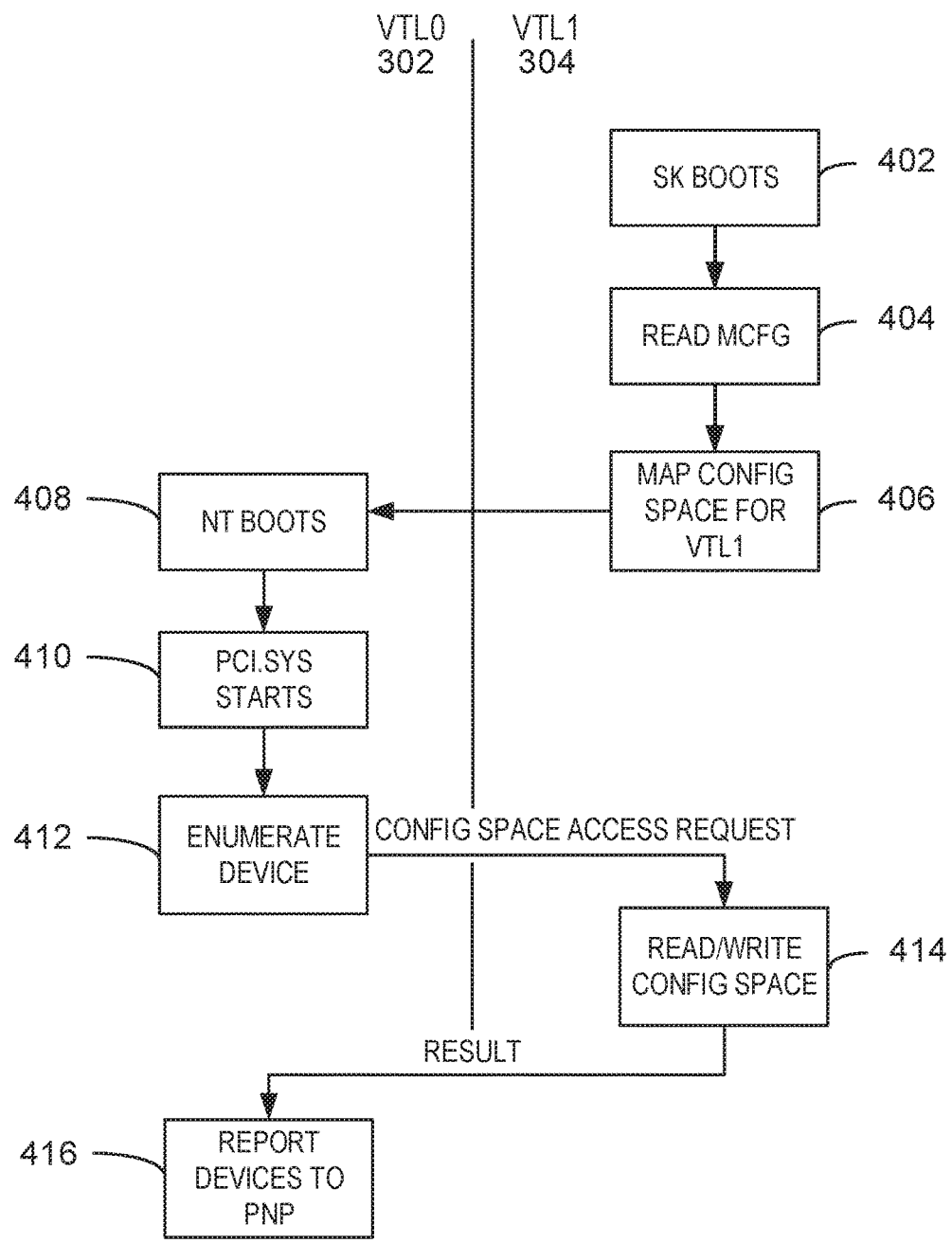
FIG. 4 is a process flow diagram of an example method for implementing PCI configuration space protection with a secure driver.

FIG. 4 is a process flow diagram of an example method for implementing peripheral component interface (PCI) configuration space protection with a secure driver. The method 400 can be implemented with any suitable computing device, such as the computing system 102 of FIG. 1. In FIG. 4, VTL0 corresponds to an unsecure kernel mode such as 302 of FIG. 3 and VTL1 corresponds to a secure kernel mode such as VTL1 304 of FIG. 3.

At block 402, a secure kernel 322 can be loaded. In some embodiments, loading the secure kernel 322 includes loading a fixed advanced configuration and power interface (ACPI) table. In some embodiments, the secure kernel 322 can manage the PCI configuration space instead of a bus driver such as PCI.sys or a bus driver in conjunction with an unsecure kernel. In some examples, if a bus driver attempts to modify a configuration space, the bus driver can transmit a request to a hardware abstraction layer, which can forward the request to the secure kernel 322. This prevents an unsecure driver from accessing the configuration space. In some examples, the secure kernel 322 can deny malicious requests such as changing a bus number of a bridge that enumerated a secure device.

At block 404, the secure kernel 322 can read a memory mapped configuration space base address description table (MCFG) and a secure device table. The MCFG table can provide information enabling memory-mapped configuration space accesses.

At block 406, the secure kernel can map the configuration space for a secure execution environment. At block 408, the secure kernel 322 can start an unsecure driver in the unsecure kernel. At block 410, the unsecure driver can start a bus driver, such as PCI.sys. At block 412, the unsecure driver can enumerate any suitable number of hardware devices.

At block 414, the secure kernel 322 can access a configuration space corresponding to a secure device with a read operation or a write operation. In some embodiments, accessing the configuration space is in response to a configuration space access request from the unsecure kernel of the unsecure execution environment 302. In some examples, the secure kernel 322 detects a configuration space access request from any attempt to access PCI configuration space registers.

At block 416, the unsecure driver can report the secure device to a plug and play device (PNP) tree. In some embodiments, reporting the secure device is in response to receiving a result from the secure kernel 322 indicating the access of the configuration space corresponding to the secure device.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application. In some embodiments, the unsecure driver can continue to enumerate additional secure devices.

Figure 5:
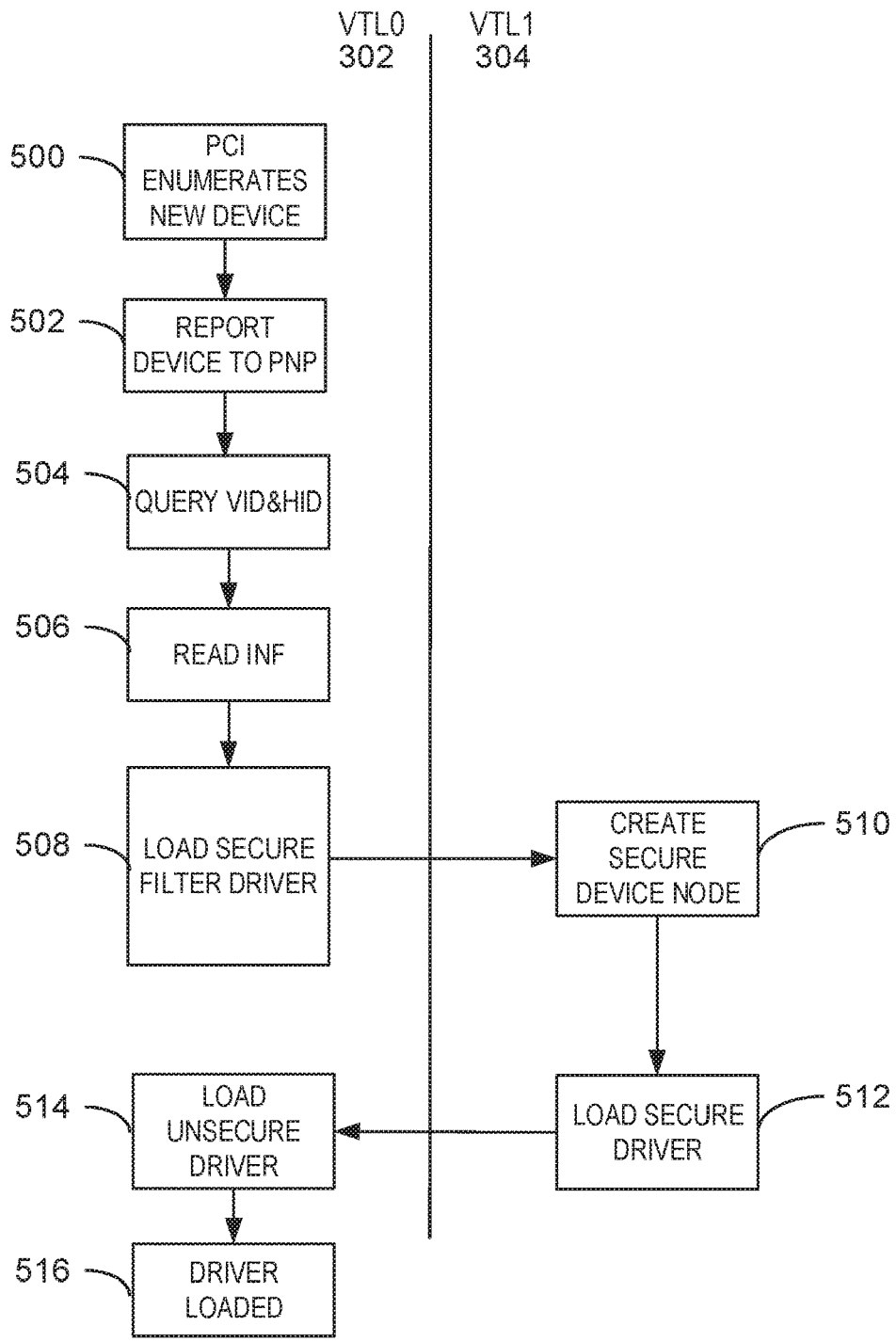
FIG. 5 is a process flow diagram of an example method framework for enumerating secure devices with a secure driver framework.

FIG. 5 is a process flow diagram of an example method framework for enumerating secure devices with a secure driver framework. The method 500 can be implemented with any suitable computing device, such as the computing system 102 of FIG. 1. In FIG. 5, VTL0 corresponds to an unsecure kernel mode such as 302 of FIG. 3 and VTL1 corresponds to a secure kernel mode such as VTL1 304 of FIG. 3.

At block 502, an unsecure driver can report a new hardware device to a plug and play (PNP) tree. At block 504, the unsecure driver can query video interface devices (VID) and human interface devices (HID).

At block 506, the unsecure driver can locate a setup information file (INF) corresponding to the reported new hardware device. The INF file can enable installation of a driver for the new hardware device. For example, the INF file can include a driver name and location, driver version information, and registry information, among others. In some embodiments, the INF file can include a service name for the unsecure driver, a lower filter driver to load the secure filter driver or secure driver, a directive to specify a filename of the secure driver filename, and the like.

At block 508, the unsecure driver can load a filter driver, such as a secure filter driver. In some embodiments, the unsecure driver detects that a filter drivers is to be loaded based on information stored in the INF file. At block 510, a secure kernel creates a secure device node in response to a request from the filter driver. In some embodiments, the request from the filter driver to create a secure device node is transmitted to the secure kernel using a remote procedure call.

At block 512, the secure kernel loads a secure driver corresponding to the secure device node that was created at block 510. The secure driver enables direct memory access to the new hardware device, input/output requests related to the new hardware device, and modification of a subset of device memory, and the like.

At block 514, the secure kernel returns a value to the unsecure kernel indicating an unsecure driver is to be loaded. In some embodiments, when the secure filter driver is attached to the plug and play tree, the secure filter driver can search for a device-specific registry key corresponding to the secure driver filename from the INF file. The secure filter driver can then launch a secure driver host based on the file name of the secure driver. The secure driver host can load the secure driver and start a remote procedure call server. The process ends at block 516.

In one embodiment, the process flow diagram of FIG. 5 is intended to indicate that the steps of the method 500 are to be executed in a particular order. Alternatively, in other embodiments, the steps of the method 500 can be executed in any suitable order and any suitable number of the steps of the method 500 can be included. Further, any number of additional steps may be included within the method 500, depending on the specific application.

Figure 6:
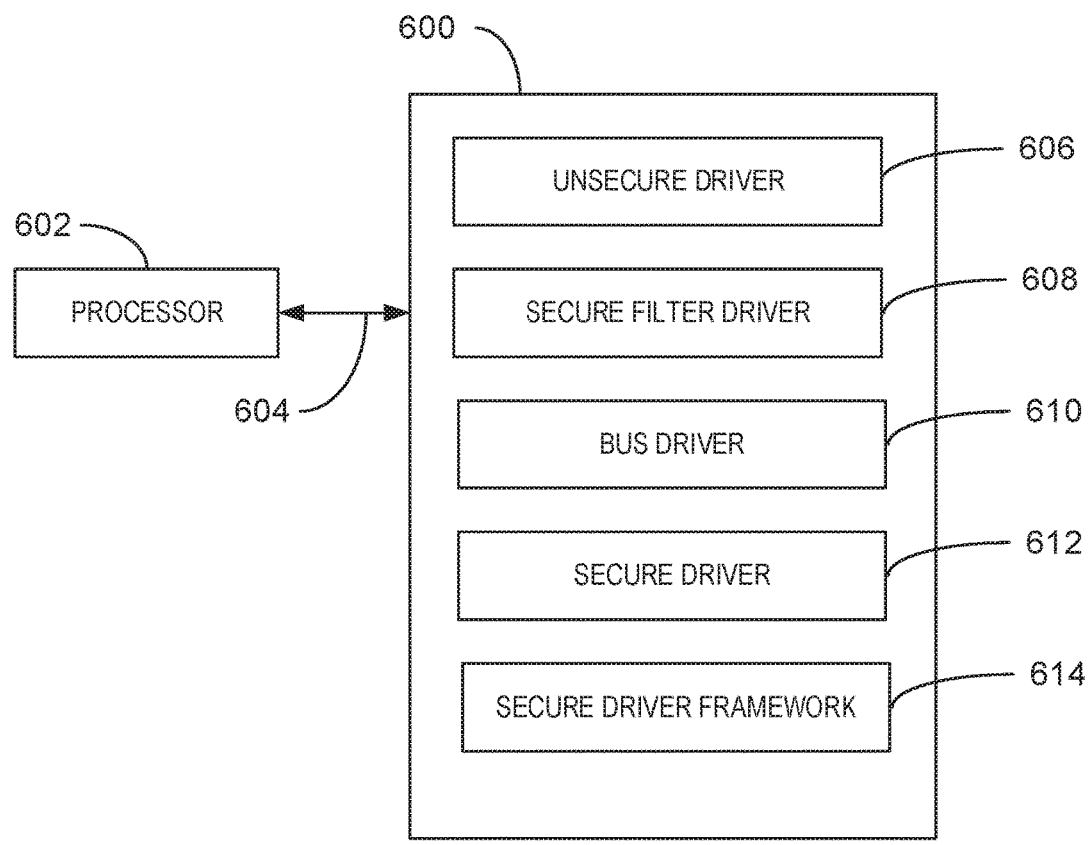
FIG. 6 is a block diagram of an example computer-readable storage media that can implement a secure driver framework.

FIG. 6 is a block diagram of an example computer-readable storage media that can implement a secure driver framework. The tangible, computer-readable storage media 600 may be accessed by a processor 602 over a computer bus 604. Furthermore, the tangible, computer-readable storage media 600 may include code to direct the processor 602 to perform the steps of the current method.

The various software components discussed herein may be stored on the tangible, computer-readable storage media 600, as indicated in FIG. 6. For example, the tangible computer-readable storage media 600 can an unsecure driver 606, a secure filter driver 608, a bus driver 610, a secure driver 612, and a secure driver framework 614. In some embodiments, the unsecure driver 606 can be an independent hardware vendor driver that attempts to access a secure device via a system call. For example the unsecure driver 606 can attempt to access memory, registers, and the like associated with a secure device. The unsecure driver 606 can send the system call to the secure filter driver 608, which can detect a system call directed to a secure device and transmit the system call via a remote procedure call to the secure driver framework 614. The secure driver framework 614 can transmit the system call to a secure driver 612, which can communicate the system call to a secure device. In some embodiments, the secure driver framework 614 can return a value from executing the system call on a secure device to the unsecure driver 606 via the secure filter driver 608. In some examples, the unsecure driver 606 can transmit any suitable information to the bus driver 610.

It is to be understood that any number of additional software components not shown in FIG. 6 may be included within the tangible, computer-readable storage media 600, depending on the specific application.

Figure 7:
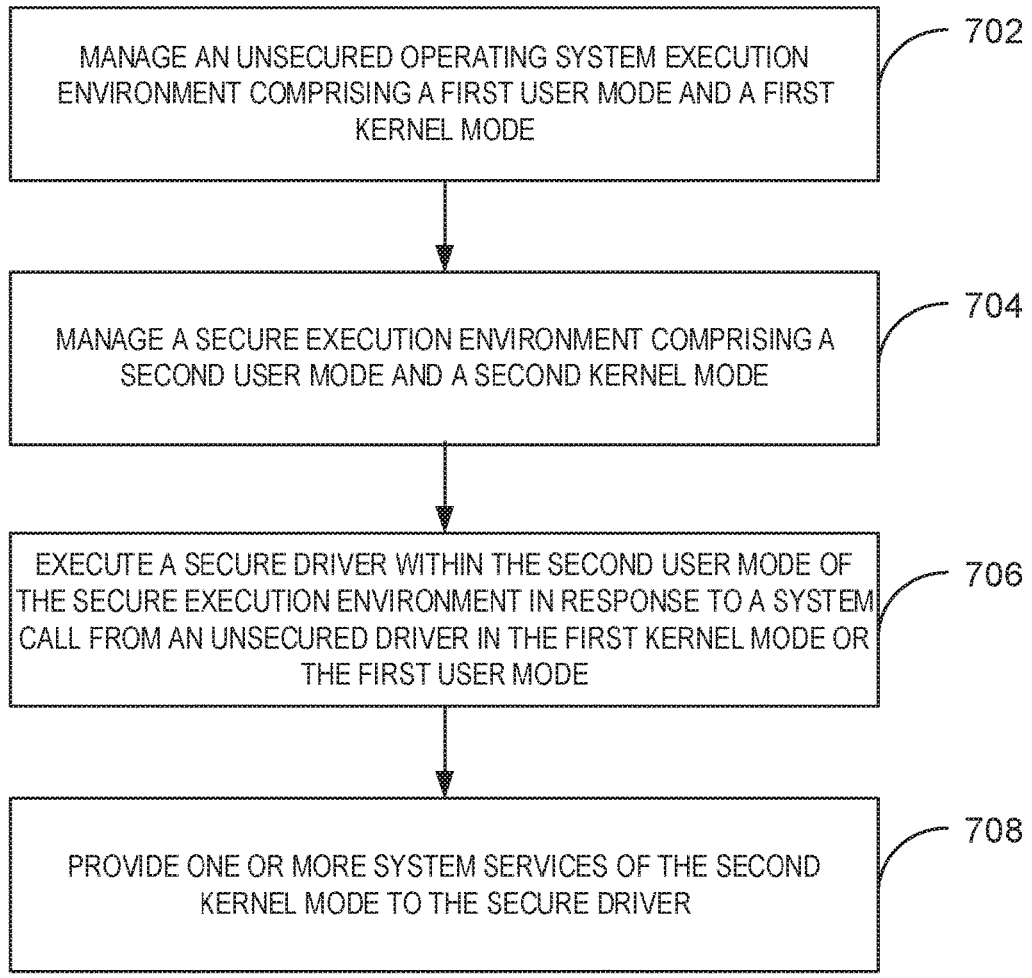
FIG. 7 is a process flow diagram illustrating a method for implementing a secure driver framework.

FIG. 7 is a process flow diagram illustrating a method for implementing a secure driver framework. The method 700 can be implemented with any suitable computing device, such as the computing system 102 of FIG. 1.

At block 702, a system can manage an unsecure operating system execution environment comprising a first user mode and a first kernel mode. For example, the system can include any number of function drivers, filter drivers, such as a secure filter driver, and bus drivers such as PCI.sys. In some embodiments, the unsecure operating system execution environment can include operating system services such as thread management, virtual memory management, and file access. The operating system services of the unsecure operating system execution environment can also include APIs (application program interfaces), such as application configuration management, GUI (graphical user interface) services, and user interfaces components, among others.

At block 704, a system can manage a secure execution environment comprising a second user mode and a second kernel mode. For example, the system can include a secure driver framework and a secure driver in the second user mode of the secure execution environment. The system can also include a secure kernel in the second kernel mode of the secure execution environment. The secure driver framework can enable the secure driver to communicate with the secure kernel to perform system calls corresponding to a secure device. For example, the secure device may include a biometric device, among others. The secure driver can enable enumeration of the secure driver, PCI configuration space protection, and input/output operations to be transmitted to the secure device, among others.

At block 706, a system can execute a secure driver within the second user mode of the secure execution environment in response to a system call from an unsecure driver in the first kernel mode or the first user mode. In some embodiments, the unsecure driver can transmit the system call to the secure driver via a remote procedure call. In some embodiments, the secure driver is launched by the unsecure driver, which serves as a filter driver. The unsecure driver can launch the secure driver by providing a file path to the secure driver and a remote procedure call server endpoint name, among others to a secure driver framework. In response, the secure driver framework can load the secure driver into memory and invoke any suitable driver entry routine. The secure driver framework can also bind the secure driver to enable the secure driver to execute function calls into the secure driver framework. The secure driver framework can also start a remote procedure call server and accept connections from the first kernel mode of the unsecure execution environment.

At block 708, a system can provide one or more system services of the second kernel mode to the secure driver. In some embodiments, the system services can include input/output requests for a secure driver, direct memory access requests for a secure driver, memory-mapped input/output requests for a secure driver, interrupts corresponding to a secure driver, and the like. In some examples, the system services include enabling an unsecure driver to modify a subset of secure device memory. In one embodiment, the system service can enable an unsecure driver to communicate with a secure driver. The secure driver can access the secure kernel mode via a secure driver framework that can load any suitable number of libraries to enable providing the system services for the secure driver. For example, the secure driver framework can load a loader library that loads a secure driver into memory. The secure driver framework can also load a server library that manages a remote procedure call server corresponding to the secure driver. For example, the server library can detect commands from a filter driver in the unsecure kernel mode of the unsecure execution environment. The commands can indicate how to control a driver state machine corresponding to a driver stack. The server library can translate commands related to remote procedure call server management and the marshalling/unmarshalling of remote procedure call buffers into function callbacks. In some examples, the server library can include functions that enable initiating a remote procedure call server and accepting incoming connections from the unsecure kernel mode. The server library can also include functions that stop execution of a remote procedure call server by preventing any new remote procedure call connections and ending incoming connections.

In some embodiments, the secure driver framework can also include a core library that includes the logic to bind the secure driver framework to a secure driver. For example, the core library can provide the secure driver framework a dispatch table corresponding to the secure driver. When the secure driver is bound to the secure driver framework, the secure driver can use the dispatch table to implement routines from the secure driver framework. For example, the dispatch table can enable the secure driver to implement routines that create secure drivers, delete objects corresponding to secure drivers, and the like.

In one embodiment, the process flow diagram of FIG. 7 is intended to indicate that the steps of the method 700 are to be executed in a particular order. Alternatively, in other embodiments, the steps of the method 700 can be executed in any suitable order and any suitable number of the steps of the method 700 can be included. Further, any number of additional steps may be included within the method 700, depending on the specific application. For example, the system can enumerate a secure device by creating a secure device node and loading the secure driver in the second user mode of the secure execution environment. Additionally, the system can also load advanced configuration and power interface tables in the second kernel mode of the secure execution environment, parse a memory mapped table in the second kernel mode of the secure execution environment; and map a configuration space for the secure execution environment. The system can also launch the unsecure driver in the first kernel mode of the unsecure operating system execution environment and enumerate a secure device in the first kernel mode. In some embodiments, the advanced configuration and power interface tables can include a memory mapped configuration space base address description table (MCFG) and a secure device table.

In some embodiments, the system can transmit a request for configuration space access from the first kernel mode of the unsecure operating system execution environment to the second kernel mode of the secure execution environment and modify the secure configuration space of the secure execution environment. Furthermore, the system can transmit a result of the modification of the secure configuration space to the first kernel mode of the unsecure operating system execution environment.

In some embodiments, the system can detect a level of security and load secure modules in an unsecure mode based on the level of security. For example, the system can detect a level of security that enables a secure driver and secure driver framework to be loaded in an unsecure kernel mode or unsecure user mode.

Example 1

In one example embodiment, a system for providing a secure driver framework can include a processor that can manage an unsecure operating system execution environment comprising a first user mode and a first kernel mode and manage a secure execution environment comprising a second user mode and a second kernel mode. The processor can also execute a secure driver within the second user mode of the secure execution environment in response to a system call from an unsecure driver in the first kernel mode or the first user mode. Additionally, the processor can provide one or more system services of the second kernel mode to the secure driver.

Alternatively, or in addition, the unsecure driver can transmit the system call to the secure driver via a remote procedure call. Alternatively, or in addition, the processor can enumerate a secure device by creating a secure device node and loading the secure driver in the second user mode of the secure execution environment. Alternatively, or in addition, the processor can load advanced configuration and power interface tables in the second kernel mode of the secure execution environment; parse a memory mapped table in the second kernel mode of the secure execution environment; map a configuration space for the secure execution environment; launch the unsecure driver in the first kernel mode of the unsecure operating system execution environment; and enumerate a secure device in the first kernel mode. Alternatively, or in addition, the advanced configuration and power interface tables can include a memory mapped configuration space base address description table (MCFG) and a secure device table. Alternatively, or in addition, the processor can transmit a request for configuration space access from the first kernel mode of the unsecure operating system execution environment to the second kernel mode of the secure execution environment; modify the secure configuration space of the secure execution environment; and transmit a result of the modification of the secure configuration space to the first kernel mode of the unsecure operating system execution environment. Alternatively, or in addition, the processor can detect an interrupt via the first kernel mode of the unsecure operating system execution environment; and transmit a remote procedure call to the secure driver in the second user mode of the secure execution environment, wherein the remote procedure call indicates the detected interrupt. Alternatively, or in addition, the processor can provide, via the second kernel mode of the secure execution environment, a direct memory access library to the second user mode, the direct memory access library enabling buffer allocation and direct read or write operations corresponding to a secure device. Alternatively, or in addition, the processor can enable the unsecure driver to modify a subset of device memory. Alternatively, or in addition, the secure driver can enable the unsecure driver to communicate with a secure device.

Example 2

In another embodiment, a method for providing a secure driver framework can include managing an unsecure operating system execution environment comprising a first user mode and a first kernel mode. The method can also include managing a secure execution environment comprising a second user mode and a second kernel mode and executing a secure driver within the second user mode of the secure execution environment in response to a system call from an unsecure driver in the first kernel mode or the first user mode, wherein the secure driver enables the unsecure driver to communicate with a secure device. Furthermore, the method can include providing one or more system services of the second kernel mode to the secure driver.

Alternatively, or in addition, the unsecure driver can transmit the system call to the secure driver via a remote procedure call. Alternatively, or in addition, the method can include enumerating a secure device by creating a secure device node and loading the secure driver in the second user mode of the secure execution environment. Alternatively, or in addition, the method can include loading advanced configuration and power interface tables in the second kernel mode of the secure execution environment; parsing a memory mapped table in the second kernel mode of the secure execution environment; mapping a configuration space for the secure execution environment; launching the unsecure driver in the first kernel mode of the unsecure operating system execution environment; and enumerating a secure device in the first kernel mode. Alternatively, or in addition, the advanced configuration and power interface tables can include a memory mapped configuration space base address description table (MCFG) and a secure device table. Alternatively, or in addition, the method can include transmitting a request for configuration space access from the first kernel mode of the unsecure operating system execution environment to the second kernel mode of the secure execution environment; modifying the secure configuration space of the secure execution environment; and transmitting a result of the modification of the secure configuration space to the first kernel mode of the unsecure operating system execution environment. Alternatively, or in addition, the method can include detecting an interrupt via the first kernel mode of the unsecure operating system execution environment; and transmitting a remote procedure call to the secure driver in the second user mode of the secure execution environment, wherein the remote procedure call indicates the detected interrupt. Alternatively, or in addition, the method can include providing, via the second kernel mode of the secure execution environment, a direct memory access library to the second user mode, the direct memory access library enabling buffer allocation and direct read or write operations corresponding to a secure device. Alternatively, or in addition, the method can include enabling the unsecure driver to modify a subset of device memory. Alternatively, or in addition, the secure driver can enable the unsecure driver to communicate with a secure device.

Example 3

In another embodiment, one or more computer-readable storage devices for implementing a secure driver framework can include a plurality of instructions that, based at least on execution by a processor, cause the processor to manage an unsecure operating system execution environment comprising a first user mode and a first kernel mode. The plurality of instructions can also cause the processor to manage a secure execution environment comprising a second user mode and a second kernel mode and execute a secure driver within the second user mode of the secure execution environment in response to a system call from an unsecure driver in the first kernel mode or the first user mode, wherein the secure driver enables the unsecure driver to communicate with a secure device. Furthermore, the plurality of instructions can cause the processor to provide one or more system services of the second kernel mode to the secure driver.

Alternatively, or in addition, the unsecure driver can transmit the system call to the secure driver via a remote procedure call. Alternatively, or in addition, the plurality of instructions can cause the processor to enumerate a secure device by creating a secure device node and loading the secure driver in the second user mode of the secure execution environment. Alternatively, or in addition, the plurality of instructions can cause the processor to load advanced configuration and power interface tables in the second kernel mode of the secure execution environment; parse a memory mapped table in the second kernel mode of the secure execution environment; map a configuration space for the secure execution environment; launch the unsecure driver in the first kernel mode of the unsecure operating system execution environment; and enumerate a secure device in the first kernel mode. Alternatively, or in addition, the advanced configuration and power interface tables can include a memory mapped configuration space base address description table (MCFG) and a secure device table. Alternatively, or in addition, the plurality of instructions can cause the processor to transmit a request for configuration space access from the first kernel mode of the unsecure operating system execution environment to the second kernel mode of the secure execution environment; modify the secure configuration space of the secure execution environment; and transmit a result of the modification of the secure configuration space to the first kernel mode of the unsecure operating system execution environment. Alternatively, or in addition, the plurality of instructions can cause the processor to detect an interrupt via the first kernel mode of the unsecure operating system execution environment; and transmit a remote procedure call to the secure driver in the second user mode of the secure execution environment, wherein the remote procedure call indicates the detected interrupt. Alternatively, or in addition, the plurality of instructions can cause the processor to provide, via the second kernel mode of the secure execution environment, a direct memory access library to the second user mode, the direct memory access library enabling buffer allocation and direct read or write operations corresponding to a secure device. Alternatively, or in addition, the plurality of instructions can cause the processor to enable the unsecure driver to modify a subset of device memory. Alternatively, or in addition, the secure driver can enable the unsecure driver to communicate with a secure device.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for providing a secure driver framework comprising:
   a hardware processor to:
   manage an unsecure operating system execution environment comprising a first user mode and a first kernel mode;
   manage a secure execution environment comprising a second user mode and a second kernel mode;
   based at least in part on a system call from an unsecure driver in the first kernel mode or the first user mode, the secure execution environment to:
      create a secure device node corresponding to a reported new hardware device;
      load a secure driver corresponding to the secure device node, the secure driver to enable accessing a configuration space of the new hardware device and loading advanced configuration and power interface tables in the second kernel mode; and
      notify the unsecure operating system execution environment indicating a second unsecure driver is to be loaded for the new hardware device the second unsecure driver to report the new hardware device in response to an indication of accessing the configuration space; and
   provide one or more system services of the second kernel mode to the secure driver.

2. The system of claim 1, wherein the unsecure driver transmits the system call to the secure driver via a remote procedure call.

3. The system of claim 1, wherein the processor is to enumerate a secure device by creating a second secure device node and loading the second secure driver in the second user mode of the secure execution environment.

4. The system of claim 1, wherein the processor is to:
   parse a memory mapped table in the second kernel mode of the secure execution environment;
   map the configuration space for the secure execution environment;
   launch the unsecure driver in the first kernel mode of the unsecure operating system execution environment; and
   enumerate a secure device in the first kernel mode.

5. The system of claim 4, wherein the advanced configuration and power interface tables comprise a memory mapped configuration space base address description table (MCFG) and a secure device table.

6. The system of claim 5, wherein the processor is to:
   transmit a request for configuration space access from the first kernel mode of the unsecure operating system execution environment to the second kernel mode of the secure execution environment;
   modify the configuration space of the secure execution environment; and
   transmit a result of the modification of the configuration space to the first kernel mode of the unsecure operating system execution environment.

7. The system of claim 1, wherein the processor is to:
   detect an interrupt via the first kernel mode of the unsecure operating system execution environment; and
   transmit a remote procedure call to the secure driver in the second user mode of the secure execution environment, wherein the remote procedure call indicates the detected interrupt.

8. The system of claim 1, wherein the processor is to provide, via the second kernel mode of the secure execution environment, a direct memory access library to the second user mode, the direct memory access library enabling buffer allocation and direct read or write operations corresponding to a secure device.

9. The system of claim 1, wherein the processor is to enable the unsecure driver to modify a subset of device memory.

10. The system of claim 1, wherein the secure driver enables the unsecure driver to communicate with a secure device.

11. A method for providing a secure driver framework comprising:
   managing an unsecure operating system execution environment comprising a first user mode and a first kernel mode;
   managing a secure execution environment comprising a second user mode and a second kernel mode, wherein based at least in part on a system call from an unsecure driver in the first kernel mode or the first user mode, the secure execution environment comprises:
   creating a secure device node corresponding to a reported new hardware device;
   loading a secure driver corresponding to the secure device node, the secure driver to enable accessing a configuration space of the new hardware device and loading advanced configuration and power interface tables in the second kernel mode; and
   notifying the unsecure operating system execution environment indicating a second unsecure driver is to be loaded for the new hardware device, the second unsecure driver to report the new hardware device in response to an indication of accessing the configuration space; and
   providing one or more system services of the second kernel mode to the secure driver.

12. The method of claim 11, wherein the unsecure driver transmits the system call to the secure driver via a remote procedure call.

13. The method of claim 11, comprising enumerating a secure device by creating a second secure device node and loading the second secure driver in the second user mode of the secure execution environment.

14. The method of claim 11, comprising:
   parsing a memory mapped table in the second kernel mode of the secure execution environment;
   mapping the configuration space for the secure execution environment;
   launching the unsecure driver in the first kernel mode of the unsecure operating system execution environment; and
   enumerating a secure device in the first kernel mode.

15. The method of claim 14, wherein the advanced configuration and power interface tables comprise a memory mapped configuration space base address description table (MCFG) and a secure device table.

16. The method of claim 15, comprising:
   transmitting a request for configuration space access from the first kernel mode of the unsecure operating system execution environment to the second kernel mode of the secure execution environment;
   modifying the configuration space of the secure execution environment; and
   transmitting a result of the modification of the configuration space to the first kernel mode of the unsecure operating system execution environment.

17. The method of claim 11, comprising:
   detecting an interrupt via the first kernel mode of the unsecure operating system execution environment; and
   transmitting a remote procedure call to the secure driver in the second user mode of the secure execution environment, wherein the remote procedure call indicates the detected interrupt.

18. The method of claim 11, comprising providing, via the second kernel mode of the secure execution environment, a direct memory access library to the second user mode, the direct memory access library enabling buffer allocation and direct read or write operations corresponding to a secure device.

19. The method of claim 11, comprising detecting a level of security and loading the secure driver in the first user mode or the first kernel mode of the unsecure operating system execution environment based on the level of security.

20. The method of claim 11, comprising dynamically loading and linking the unsecure driver and the secure driver.

21. One or more computer-readable storage devices for implementing a secure driver framework comprising a plurality of instructions that, based at least on execution by a processor, cause the processor to
   manage an unsecure operating system execution environment comprising a first user mode and a first kernel mode;
   manage a secure execution environment comprising a second user mode and a second kernel mode, wherein based at least in part on a system call from an unsecure driver in the first kernel mode or the first user mode, the secure execution environment is to:
   create a secure device node corresponding to a reported new hardware device;
   load a secure driver corresponding to the secure device node, the secure driver to enable accessing a configuration space of the new hardware device and loading advanced configuration and power interface tables in the second kernel mode; and
   notify the unsecure operating system execution environment indicating a second unsecure driver is to be loaded for the new hardware device the second unsecure driver to report the new hardware device in response to an indication of accessing the configuration space; and
   provide one or more system services of the second kernel mode to the secure driver.

22. The one or more computer-readable storage devices of claim 21, wherein the plurality of instructions cause the processor to:
   transmit a request for configuration space access from the first kernel mode of the unsecure operating system execution environment to the second kernel mode of the secure execution environment;
   modify the configuration space of the secure execution environment; and
   transmit a result of the modification of the configuration space to the first kernel mode of the unsecure operating system execution environment.

23. The system of claim 1, wherein the processor is to report the new hardware device to a plug and play device tree.

* * * * *